US008244845B2

(12) United States Patent  (10) Patent No.: US 8,244,845 B2
Rao  (45) Date of Patent: Aug. 14, 2012

(54) IP BASED NOTIFICATION OF DEVICE MANAGEMENT OPERATIONS IN A NETWORK

(75) Inventor: Bindu Rama Rao, Laguna Niguel, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 571 days.

(21) Appl. No.: 11/947,322

(22) Filed: Nov. 29, 2007

(65) Prior Publication Data

US 2008/0126555 A1  May 29, 2008

Related U.S. Application Data

(60) Provisional application No. 60/861,696, filed on Nov. 29, 2006.

(51) Int. Cl.
*G06F 15/173* (2006.01)

(52) U.S. Cl. ........ 709/223; 709/232; 709/230; 709/238; 370/252; 380/270; 719/315; 713/2; 455/410; 455/412.1

(58) Field of Classification Search .................... 709/223
See application file for complete search history.

(56) References Cited

U.S. PATENT DOCUMENTS

| | | | | |
|---|---|---|---|---|
| 6,463,300 | B1* | 10/2002 | Oshima | 455/558 |
| 7,509,496 | B2* | 3/2009 | Skog et al. | 713/170 |
| 7,673,325 | B2* | 3/2010 | Vincent et al. | 726/3 |
| 7,823,155 | B2* | 10/2010 | Misra et al. | 718/104 |
| 7,844,964 | B2* | 11/2010 | Marolia | 717/172 |
| 7,889,869 | B2* | 2/2011 | Ypa et al. | 380/270 |
| 2002/0159479 | A1* | 10/2002 | Watanuki et al. | 370/466 |
| 2003/0018810 | A1* | 1/2003 | Karagiannis et al. | 709/238 |
| 2005/0220079 | A1 | 10/2005 | Asokan | |
| 2006/0010437 | A1* | 1/2006 | Marolia | 717/168 |
| 2006/0087982 | A1* | 4/2006 | Kuure et al. | 370/252 |
| 2006/0174242 | A1* | 8/2006 | Zhu et al. | 717/172 |
| 2006/0190608 | A1* | 8/2006 | Sahinoja et al. | 709/227 |
| 2006/0193337 | A1* | 8/2006 | Paila et al. | 370/432 |
| 2006/0200658 | A1* | 9/2006 | Penkethman | 713/2 |
| 2006/0200814 | A1* | 9/2006 | Kontinen et al. | 717/168 |
| 2006/0236325 | A1* | 10/2006 | Rao et al. | 719/315 |
| 2006/0271659 | A1* | 11/2006 | Mittal et al. | 709/223 |
| 2007/0043849 | A1* | 2/2007 | Lill et al. | 709/224 |
| 2007/0106806 | A1* | 5/2007 | Tu et al. | 709/230 |
| 2007/0186108 | A1* | 8/2007 | Passarella et al. | 713/171 |
| 2007/0283003 | A1* | 12/2007 | Broyles et al. | 709/224 |
| 2008/0032736 | A1* | 2/2008 | Bari et al. | 455/552.1 |

(Continued)

OTHER PUBLICATIONS

Open Mobile Alliance, "OMA Device Management Security", Jul. 2005, Candidate Version 1.2.*

(Continued)

*Primary Examiner* — Krista Zele
*Assistant Examiner* — Ondrej Vostal

(57) ABSTRACT

A method and system for interfacing to an electronic device is disclosed. The interfacing may comprise one or more servers in a wireless network communicating internet protocol (IP) based messages to one or more electronic devices, where the wireless network may also communicate with the electronic devices using a network protocol that is not internet protocol. The IP based messages may be used to conduct device management of the electronic devices. The IP based messages may be digitally signed for security purposes. For mobile devices that do not have an IP address, a server may assign and IP address when the electronic device first enters the wireless network. Accordingly, the assigning of the IP address may be via a non-IP network protocol.

21 Claims, 4 Drawing Sheets

U.S. PATENT DOCUMENTS

| | | | | |
|---|---|---|---|---|
| 2008/0043726 A1* | 2/2008 | Herrero-Veron et al. | | 370/352 |
| 2008/0046583 A1* | 2/2008 | Rao | | 709/230 |
| 2008/0057947 A1* | 3/2008 | Marolia et al. | | 455/425 |
| 2008/0062900 A1* | 3/2008 | Rao | | 370/310 |
| 2008/0062926 A1* | 3/2008 | Oba | | 370/331 |
| 2008/0108321 A1* | 5/2008 | Taaghol et al. | | 455/410 |
| 2008/0127320 A1* | 5/2008 | De Lutiis et al. | | 726/9 |
| 2008/0160983 A1* | 7/2008 | Poplett et al. | | 455/419 |
| 2008/0244049 A1* | 10/2008 | Normark et al. | | 709/223 |
| 2009/0064341 A1* | 3/2009 | Hartung et al. | | 726/27 |
| 2009/0075641 A1* | 3/2009 | Guven et al. | | 455/419 |
| 2009/0077215 A1* | 3/2009 | Jayanthi | | 709/223 |
| 2009/0204845 A1* | 8/2009 | Herscovitz et al. | | 714/2 |
| 2009/0328099 A1* | 12/2009 | Praden et al. | | 725/39 |
| 2010/0275010 A1* | 10/2010 | Ghirardi | | 713/155 |
| 2010/0279733 A1* | 11/2010 | Karsten et al. | | 455/552.1 |
| 2010/0287308 A1* | 11/2010 | Robbin et al. | | 709/248 |

OTHER PUBLICATIONS

Funambol Inc, "Funambol DM Server Developer's Guide Version 3.0", Sep. 2006.*

Open Mobile Alliance, "Firmware Update Management Object", 2006.*

Open Mobile Alliance, "SyncML Device Management Bootstrap", 2003.*

Office Action received in related German Application No. 112007002863.7; Dated Jun. 22, 2011, pp. 5.

Paila, et al; "FLUTE-File Delivery Over Unidirectional Transport"; Network Working Group Request for Comments; 3926 Category: Experimental: Oct. 2004.

* cited by examiner

IP BASED NOTIFICATION OF DEVICE MANAGEMENT OPERATIONS IN A NETWORK

The present application makes reference to, claims priority to, and claims benefit of U.S. Provisional Application Ser. No. 60/861,696 entitled "IP Based Notification Of Device Management Operations In A Network," filed Nov. 29, 2006, the complete subject matter of which is hereby incorporated herein by reference, in its entirety.

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. The software/firmware on the electronic devices may need to be updated by a device management (DM) server. The DM server may notify an electronic device prior to starting a DM session.

Further limitations and disadvantages of conventional and traditional approaches will become apparent to one of skill in the art, through comparison of such systems with the present invention as set forth in the remainder of the present application with reference to the drawings.

DETAILED DESCRIPTION OF THE INVENTION

Aspects of the present invention relate generally to managing electronic devices, and, more specifically, to internet protocol (IP) based notifications of device management operations in a network. While the following discussion focuses primarily on mobile electronic devices such as, for example, a mobile handset, a cellular phone, a personal digital assistant, a pager, and a handheld personal computer, this is by way of example and not by way of specific limitations of the present invention. The teachings contained herein may also be applicable to a variety of other electronic devices for which one or more servers may be used to manage the electronic devices.

In an example, a method is disclosed for interfacing to an electronic device. The method may include communicating, in a wireless network, an Open Mobile Alliance (OMA) device management (DM) compliant notification message using internet protocol based messages from authorized DM servers to one or more electronic devices, wherein the wireless network is enabled to communicate with the one or more electronic devices using a network protocol that is not interne protocol. As part of a registration process, a home agent creates a binding table entry in a registry to associate a home address of the one or more electronic devices with a corresponding care-of address. When the one or more electronic devices is roaming away from a home network, the one or more electronic devices is associated with the care-of address. The method may include conducting device management of the one or more electronic devices using internet protocol based messages using the network protocol that is not interne protocol, wherein messages sent to the one or more electronic devices are via WAP Push and the messages are digitally signed to enable proper processing by the one or more electronic devices, the header indicating the type of signature. The authorized DM servers for the one or more electronic devices may be pre-determined, and information identifying the authorized servers is directly pre-provisioned into the one or more electronic devices.

Various embodiments of the present invention may comprise interfacing to the electronic devices using wired or wireless communication channels such as, for example, a public switched telephone network, a wired local or wide area network, an intranet, the Internet, and wireless cellular, paging, local area, personal area, and various networks such as those that may use, for example, the internet protocol. The interfacing may comprise one or more servers in a wireless network communicating internet protocol (IP) based messages to one or more electronic devices, where the wireless network may also communicate with the electronic devices using a network protocol that is not internet protocol.

Figure 1:
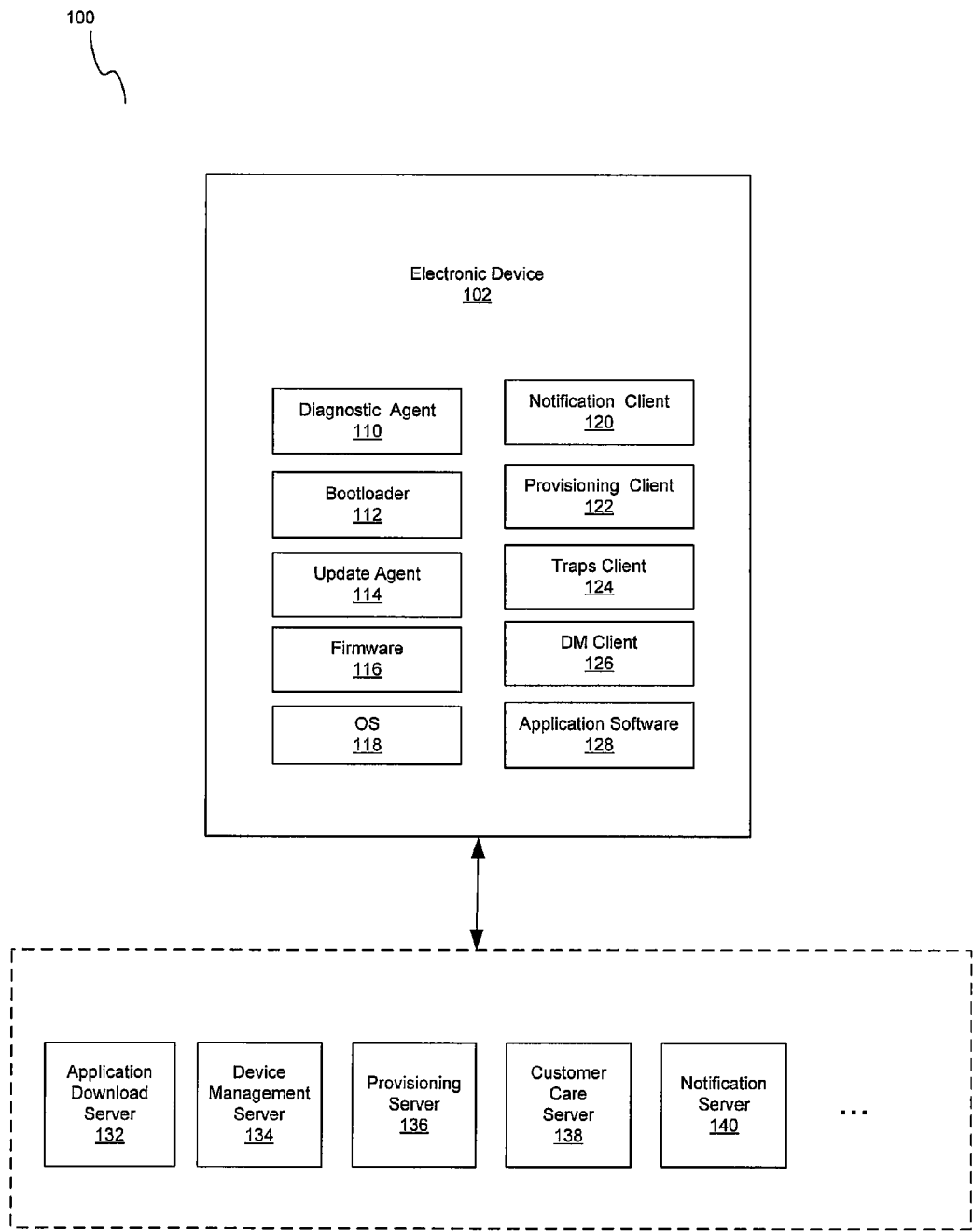
FIG. 1 is a perspective block diagram of a network that is capable of provisioning and managing electronic devices, in accordance with an embodiment of the present invention.

FIG. 1 is a perspective block diagram of a network that is capable of provisioning and managing electronic devices, in accordance with an embodiment of the present invention. Referring to FIG. 1, there is shown a network system 100 that comprises a plurality of servers 132 . . . 140, such as, for example, an application download server 132, a device management (DM) server 134, a provisioning server 136, a customer care server 138, and a notification server 140. There is also shown an electronic device 102 that may communicate with one or more of the servers 132 . . . 140.

The electronic device 102 may be, for example, a mobile terminal such as a cellular phone or a personal digital assistant (PDA). The electronic device 102 may comprise code that may be resident in various memory devices (not shown). The term "code" may be used herein to represent one or more of executable instructions, operand data, configuration parameters, and other information stored in the electronic device 102.

Some exemplary code that may reside in the electronic device 102 may comprise, for example, a diagnostic agent 110, a bootloader 112, an update agent 114, firmware 116, an operating system (OS) 118, a notification client 120, a provisioning client 122, a traps client 124, a device management (DM) client 126, and application software 128.

The diagnostic agent 110 in the electronic device 102 may be a client side diagnostics application that runs on the electronic device 102 when needed and which manages and collects tracing information. The tracing information may be communicated to a server, for example, wirelessly via a data network. The diagnostic agent 110 may also monitor one or more applications, where the monitoring may be constant or periodic. The bootloader 112 may comprise suitable code that may be executed upon power-up, or system reset, to bring the electronic device 102 to an operational state. After the initial booting of the system, for example, the operating system 118 may control operation of the electronic device 102. The update agent 114 may comprise suitable code that may allow, for example, installation and/or updating of the various codes in the electronic device 102. The firmware 116 may comprise, for example, code that may enable specific functionalities of the electronic device 102 to be executed.

The notification client 120 may enable reception of notification of DM messages. The received messages may be communicated to, for example, the DM client 126. The provisioning client 122 may enable provisioning of the electronic device 102. Provisioning of the electronic device 102 may comprise, for example, providing information to various data structures needed by various functionalities. Some functionalities may comprise, for example, communication via a wireless network, repairing of configuration problems, and/or configuring of software and/or hardware.

The traps client 124 may facilitate the setting of traps and retrieving of collected information. The device management (DM) client 126 may comprise code that may allow interaction with, for example, the DM server 134, the diagnostic agent 110, the notification client 120, and/or the traps client 124, to receive DM commands from the DM server 134 and to implement them in the electronic device 102. The application software 128 may comprise code that may allow a user to access various functionalities. The application download server 132 may be employed to download and/or update applications to the electronic device 102.

The DM server 134 may, for example, support an Open Mobile Alliance (OMA) DM protocol by which the OMA DM-based application manipulates OMA DM-capable electronic devices such as, for example, the electronic device 102. The electronic device 102 may also receive provisioning information from, for example, the provisioning server 136 that may enable repairing of configuration problems or reconfiguring software and/or hardware. The electronic device 102 may be used to request updates to software/firmware via a customer care server 138 either directly by using a browser application in the electronic device 102, or via a customer service representative (CSR). The CSR may, for example, provide service to the customer using the electronic device 102 by retrieving, as necessary, one or more diagnostic management objects (MOs) that may be stored in memory of the electronic device 102. For example, the CSR may cause update information in the form of one or more update packages to be transmitted to the electronic device 102 from a remote server. Such update packages may, for example, comprise instructions to convert or transform a first version of software/firmware to a second version of software/firmware.

A user of the electronic device 102 may access, for example, a self-care website/portal (not shown) to request customer care service via the customer care server 138, using the device capability information as one of the parameters provided. A customer service representative (CSR) may then provide service to the customer using the electronic device 102, after determining the device capability information that is retrieved from the electronic device 102, thereby making it unnecessary for a customer to provide such information himself to a CSR. The network system 100 may be capable of supporting remote diagnostics by a CSR via the customer care server 138. The network system 100 may also support a diagnostic data collection request from a DM server 134 and return the collected diagnostics data to the DM server 134 or to any other authorized server in the network system 100. The customer/subscriber of the electronic device 102 might be having problems and may need some help in diagnosing the problems—the network system 100 facilitates diagnosis by a CSR via the customer care server 138, as well as by the DM server 134.

The electronic device 102 may be capable of receiving update packages from one or more of the servers 132 . . . 140.

The electronic device 102 may be capable of applying the received update packages using one or more update agents 114 that are each capable of processing update packages or subsets thereof. The electronic device 102 also comprises the notification agent 120 and the DM client 126 that may be capable of interacting with, for example, the provisioning client 122 and the traps client 124. The DM client 126 may receive DM commands from the DM server 134 and/or via the notification agent 120, and implement them. The application download server 132 is used to download firmware and software updates. It is also used to retrieve a bundle of applications needed to update a minimal or generic electronic device 102 into a device that comprises all applications corresponding to a user's subscription level or service plan.

Provisioning of carrier-specific models of electronic devices may also be supported in the network system 100. In addition, a minimal carrier-specific electronic device 102 may be provisioned to work effectively with different services in the network system 100, and also be updated with additional applications subscribed to by a user. The additional applications may be those that the electronic device 102 does not initially provide, and where the user is entitled to use those additional applications according to a user's service plan.

Accordingly, in accordance with an embodiment of the present invention, the network system 100 may provision the electronic device 102 for specific device features or applications. The network system 100 may be capable of supporting management of the electronic device 102 using, for example, internet protocol (IP) based notification.

Figure 2:
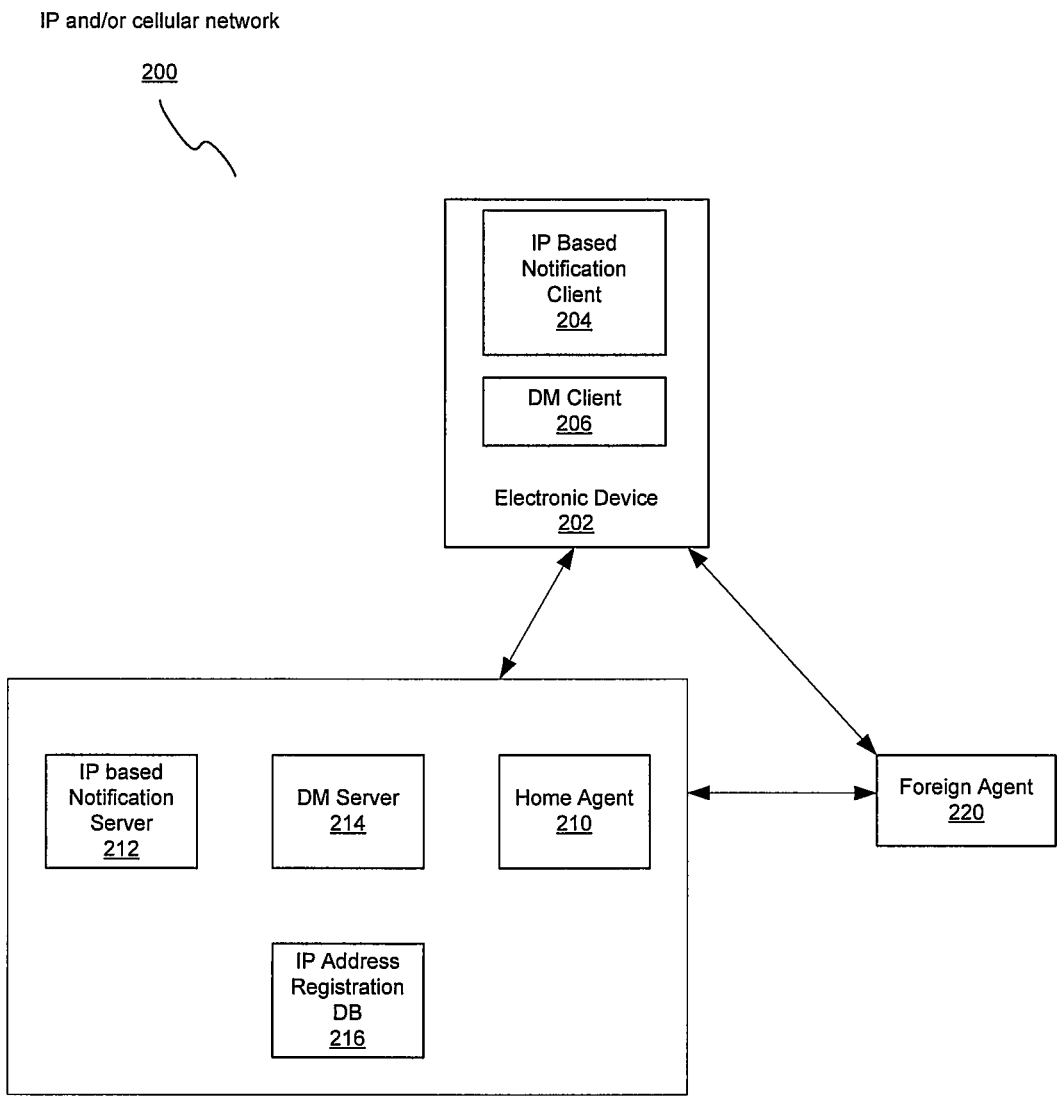
FIG. 2 is a perspective block diagram of a network where IP based notification is facilitated by a DM client in a mobile device that is communicatively coupled to a DM server and an IP based notification server, in accordance with an embodiment of the present invention.

FIG. 2 is a perspective block diagram of a network where IP based notification is facilitated by a DM client in a mobile device that is communicatively coupled to a DM server and an IP based notification server, in accordance with an embodiment of the present invention. Referring to FIG. 2, there is shown a network that comprises one or more mobile devices 202, a home agent 210, an IP based notification server 212, a DM server 214, and an IP address registration database 216. The mobile device 202 may comprise, for example, an IP based notification client 204 and a DM client 206. There is also shown a foreign agent 220 that may enable registration of the mobile device 202 with the home agent 210.

The network 200 may comprise, for example, a cellular network and/or an IP based network such as wireless local area network (WLAN: IEEE 802.11) and WiMax (IEEE 802.16). The term "cellular network" may be used to generally denote mobile communication networks, where speech, data, and multi-media data may be communicated. Multi-media data may comprise, for example, video, photographic, and audio data. The technologies used in the cellular networks may comprise, for example, Global System For Mobile Communication (GSM), General Packet Radio Service (GPRS), Enhanced Data Rates for Global Evolution (EDGE), Code Division Multiple Access 2000 (CDMA2000), Wideband CDMA (W-CDMA), and/or digital video broadcast (DVB) technologies.

The mobile device 202 may be similar to the electronic device 102. The IP based notification client 204, the DM client 206, the IP based notification server 212, and the DM server 214 may be similar to the notification client 120, the DM client 126, the notification server 140, and the DM server 134.

The home agent 210 may, for example, act as an anchor point for mobile devices for which Mobile IP or Proxy Mobile IP (PMIP) services are provided. Traffic sent to the mobile device 202 may be routed, for example, via the home agent 210. Traffic from the mobile device 202 may also be routed via the home agent 210 using reverse tunneling. In accordance with an embodiment of the present invention, a mobile device may register with its home agent through the foreign agent 220 when it is roaming.

The IP address registration database 216 may be used to store, for example, IP addresses for a plurality of mobile devices 202 served by the network 200. An IP address of a mobile device, such as, for example, the mobile device 202, may be retrieved from the IP address registration database 216.

The DM server 214 may be used to conduct device management on, for example, the mobile device 202, where the mobile device 202 may be capable of receiving IP based notifications indicating device management sessions. The mobile device 202 may be enabled to operate in various wireless networks, such as, for example, cellular networks and/or IP based networks such as wireless local area network (WLAN: IEEE 802.11) and WiMax (IEEE 802.16).

There may be communication between the network 200 and the mobile device 202 using IP based protocols while maintaining format and functionality of other notification technologies, such as, for example, wireless application protocol (WAP) or short messaging service (SMS). Existing messaging protocols supported by the mobile device 202 may be reused for the purpose of sending and receiving notifications over IP. Various embodiments of the invention may maintain an association between the mobile station international subscriber directory number (MSISDN) of a mobile device 202 and the IP address of the mobile device 202. This may facilitate supporting registration and authentication of the mobile device 202 for notification services, such as those over SMS services.

In various embodiments of the invention, the DM server 214, the mobile device 202, and the IP based notification server (or gateway) 212 may be communicatively coupled to each other and to the IP address registration database 216. In some mobile networks, traffic to and/or from any given device may be routed via the home agent 210. For example, the mobile device 202 may register with its home agent 210 through the foreign agent 220, especially if it is roaming. For example, in the context of a CDMA2000 network, the foreign agent 220 may be a Cisco packet data service node (PDSN). The home agent 210 may accept the registration, assign an IP address to the mobile device 202, and create a tunnel to the foreign agent 220. The resulting configuration may be a point-to-point (PPP) link between the mobile device 202 and the foreign agent 220, and an IP-in-IP or generic routing encapsulation (GRE) tunnel between the foreign agent 220 and the home agent 210.

As part of a registration process, the home agent 210 may create a binding table entry in a registry to associate a home address of the mobile device 202 with its care-of address. In general, when a user of the mobile device 202 is roaming away from his home network, the mobile device 202 may be associated with a care-of address. The care-of address may identify a mobile device's current, topological point of attachment to the Internet, and may be used to route packets to the mobile device 202. The care-of address may be, for example, an address of the foreign agent 220, or an address obtained by the mobile device 202 for use while it is present on a particular network. The mobile device 202 may send packets with its home address as the source IP address. Packets destined for the mobile device 202 may go through the home agent 210, which may then tunnel them to the mobile device 202 using the care-of address.

The IP address assigned to a mobile device by the home agent 210 may be used to forward DM notifications sent by the DM server 214 to the mobile device 202. The home agent 210 may accept the registration from the mobile device 202, assign an IP address to the mobile device 202, and create a tunnel to the foreign agent 220. The IP address assigned to the mobile device 202 may be used to send DM notifications to the mobile device 202.

Management objects in the DM client 206 may be used to provision the IP address into the mobile device 202 or to retrieve an IP address from the mobile device 202. The IP address may be provided as a node in a management tree, with an associated address type, wherein the address type may be, for example, internet protocol—Version 4 (IPv4) or Internet protocol—Version 6 (IPv6). Other address types may also be used.

For example, for various embodiments of the invention where an address type may be either IPv4 or IPv6, a single bit may indicate the address type. The address type may also be indicated, for example, by a character. In instances where the address type is not supplied, an embodiment of the invention may default the address type as, for example, IPv4. A device address may be generated according to, for example, classless inter-domain routing (CIDR) convention.

In various embodiments of the invention, the DM server 214 may enable digitally signing of messages, such as notification messages, that may be sent to the mobile device 202. Message signing provides security such that the mobile device 202 can determine that the messages originated at the DM server 214. Thus, for additional security, the DM server 214 may digitally sign a message, and append the signature external to the message as part of the transport delivery, for example, as an extra header.

For example, if the DM server 214 employs a WAP Push as a transport for messages, such as notification messages, the digital signature of the message may also be included. A signature type may be indicated to enable proper processing by the mobile device 202. For WAP Push, for example, the 'X-DM-Sign-Type' header may be used to indicate the type of signature, and 'X-DM-Sign-Data' header may be used to provide the actual signature data.

The DM server 214 may employ broadcast protocols or multicast protocols to send DM messages to multiple devices, such as the mobile device 202. For example, the DM server 214 may use TCP/IP as a transport of bootstrap messages to the mobile device 202. The IP based notification client 204, or alternatively, the DM client 206, may listen on a special port for notification messages over a transmission control protocol over internet protocol (TCP/IP) based transport and/or a UDP based transport. The special port may be, for example, registered with standards bodies.

Authorized servers, such as the DM server 214, may be pre-determined, and the DM client 206 may be capable of determining if the notification messages originated from authorized servers such as the DM server 214. Information identifying the authorized servers may be directly pre-provisioned into the mobile device 202 by, for example, the manufacturer of the mobile device 202 and/or a communication service provider. Information identifying the authorized servers may also be provisioned via a subscriber identity module (SIM)/Smart Card used by the mobile device 202. The DM server 214 may digitally sign the bootstrap message and/or notification messages sent to the mobile device 202. The signature and signature type may be delivered as additional headers for the messages and/or notifications sent to the mobile device 202.

In an embodiment of the invention, the IP address of the mobile device 202 may be registered by the mobile device 202 with the DM server 214 for subsequent use by the DM server 214 and/or the IP based notification server 212, in sending notifications. The IP address may be common management information protocol (CMIP) based or PMIP based IP addresses.

In various embodiments of the invention, the network 200 may be an Universal Mobile Telecommunications System (UMTS) network. The mobile device 202 may register its own proxy's IP address with the DM server 214. When the mobile device 202 comes onto the network 200, it may be assigned an IP address by the network 200. The IP address assigned to the mobile device 202 may then be used by the IP based notification server 212 to send notifications. Various embodiments of the invention may also use the DM server 214 to send the notifications, if the IP based notification server 212 is integrated into the DM server 214. The mobile device 202 may listen at the special port assigned for DM notification messages and BM bootstraps, and the network 200 may send bootstrap and/or notification messages to that special port in the mobile device 202.

In various embodiments of the invention, the network 200 may utilize multicast and/or multipoint broadcasts for communicating bootstrap and/or notification messages to the mobile device 202. For example, the operator of the network 200 may selectively use a broadcast channel for transmission of a bootstrap message to the mobile device 202. A broadcast client (not shown) in the mobile device 202 may monitor one or more assigned channels for broadcast DM messages, including bootstrap messages, retrieve the DM messages from one of the assigned channels, and pass the DM messages to the DM client 206 for processing. The broadcast client may monitor for bootstrap messages, for example, during a designated time period dedicated for bootstrap messages. In general, bootstrap messages may not include application layer security information, such as credentials to be used by mobile devices for DM sessions.

In various embodiments of the invention where broadcast channels may be used to broadcast DM notification messages, specific target devices may be targeted by the DM server 214 by sending at least one set of device information, such as, for example, make, model, versions, etc., in a header for the DM notification message. The DM server 214 may employ point-to-point protocols, such as OMA-DM, which may be based on, for example, synchronization mark-up language (SyncML) DM, to bootstrap the device with device specific credentials, etc. Subsequent continuous provisioning of parameters in the mobile device 202 may occur via broadcast protocols. For example, invoking firmware update management object (FUMO) on devices of a particular make, model and version may occur over broadcast protocols, with the make, model, version, etc. provided as criteria in the broadcast message to enable recipient mobile devices to extract/retrieve the messages and process them.

In various embodiments of the invention, the DM server 214 may also comprise the IP based notification server (or gateway) 212 and the IP address registration database 216. Thus, the DM server 214 may communicate IP based notifications to the mobile device 202, where the IP address for the mobile device 202 may be retrieved from the IP address registration database 216. In various embodiments of the invention, the mobile device 202 may comprise the DM client 206 that may also comprise functionality of the IP based notification client 204.

Figure 3:
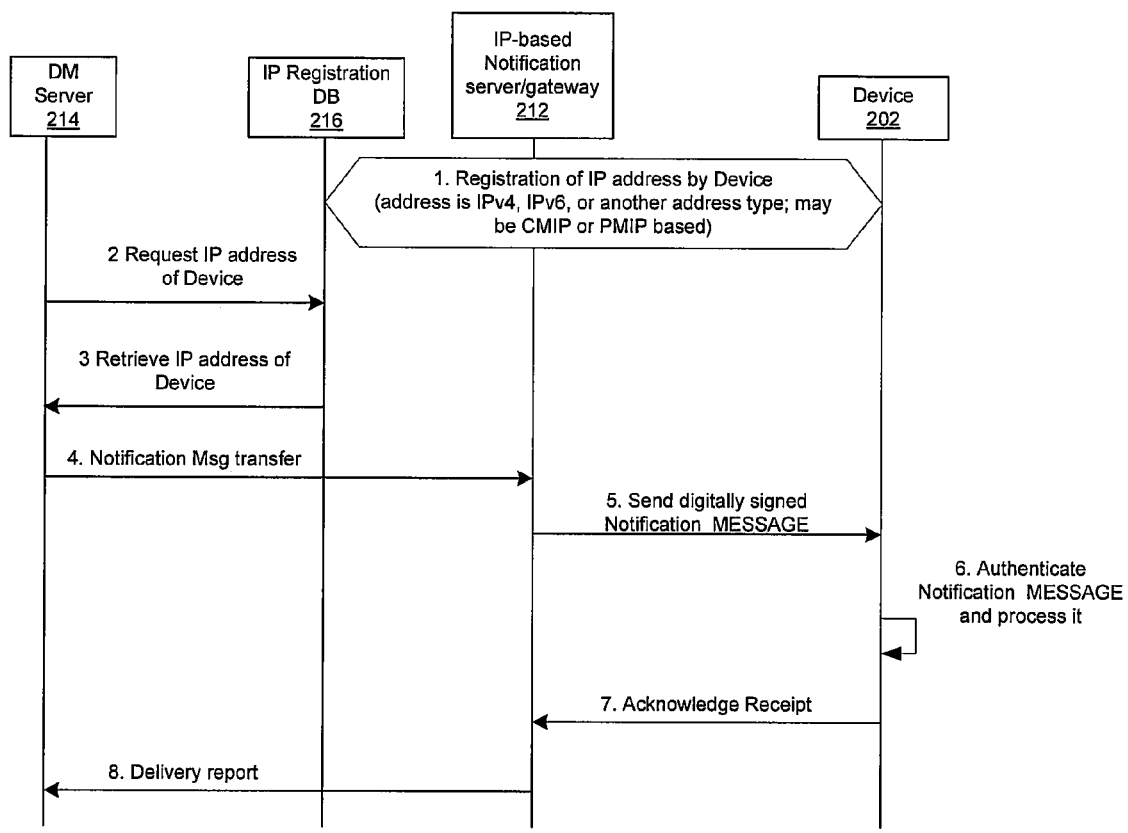
FIG. 3 is an exemplary flow diagram illustrating IP based notifications of device management operations in a network, in accordance with an embodiment of the present invention.

FIG. 3 is an exemplary flow diagram illustrating IP based notifications of device management operations in a network, in accordance with an embodiment of the present invention. Referring to FIG. 3, there is shown steps 1-8 that reflect exemplary communication by the DM server 214, the IP registration server 216, the IP-based notification server 212, and the mobile device 202.

In step 1, the mobile device 202 may register its IP address with the IP registration database 216 when the mobile device 202 enters the network 200 or when the mobile device 202 is assigned an IP address by one or more servers in the network 200. The registered address may be, for example, IPv4 or IPv6 address type, and the address may be CMIP based or PMIP based IP.

In step 2, the DM server 214 may proceed to open a DM session with the mobile device 202. Accordingly, the DM server 214 may request the IP address of the mobile device 202 from the IP registration database 216. In step 3, the IP address of the mobile device 202 may be communicated from the IP registration database 216 to the DM server 214.

In step 4, the DM server 214 may communicate to the IP-based notification server 212 to send a notification message to the mobile device 202. The IP address for the mobile device 202 may also be communicated to the IP-based notification server 212. In step 5, the IP-based notification server 212 may send the notification message to the mobile device 202. In step 6, the mobile device 202 may process the notification message after authenticating it. Authentication may comprise, for example, verifying the digital signature that may have been sent in a header that may correspond to the notification message.

In step 7, the mobile device 202 may acknowledge receipt of the notification message to the IP-based notification server 212. In step 8, the IP-based notification server 212 may communicate a delivery report to the DM server 214. Accordingly, the DM server 214 may receive confirmation that the notification message it requested to be sent to the mobile device 202 may have been received by the mobile device 202.

Figure 4:
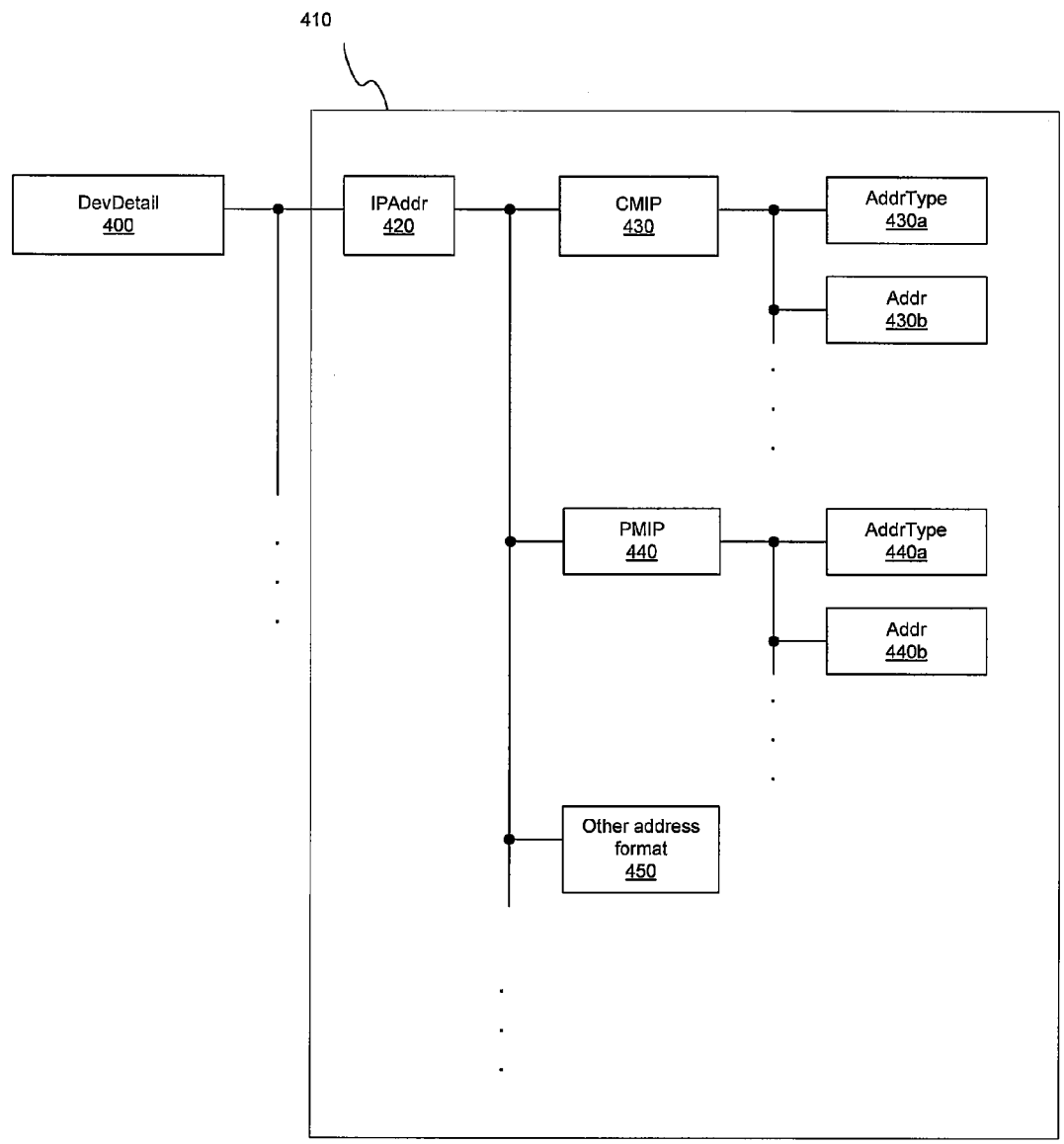
FIG. 4 is an exemplary extension to a Device Detail management object, in accordance with an embodiment of the present invention.

FIG. 4 is an exemplary extension to a DeviceDetail management object, in accordance with an embodiment of the present invention. Referring to FIG. 4, there is shown the DeviceDetail management object 400, which may comprise extension field 410. The DeviceDetail management object 400 may comprise information regarding, for example, the mobile device 202. The extension field 410 may be used to store additional information that may be used for communication via IP. The information may be stored, for example, in an IP address field 420, a CMIP field 430, a CMIP address type field 430a, a CMIP address field 430b, a PMIP field 440, a PMIP address type field 440a, and a PMIP address field 440b. There may also be an "Other address format" field 450 that may be used for IP address formats other than CMIP or PMIP.

The specific user interface for accessing the various extension fields may be design dependent. For example, the extension fields may be filled with default values and the user or a program may fill the correct values in appropriately, such as when the mobile device 202 is assigned an IP address when it first enters a network.

An exemplary extension field 410 to a DevDetail management object 400 may facilitate provisioning IP addresses into, and retrieving from, a mobile device. The DevDetail management object 400 may comprise an IPAddr field 420 that can be expressed as one of a CMIP address 430, a PMIP address 440, or other address 450, where each of these addresses may be further specified by an address type and an address value.

The DevDetail management object 400, which is a standard object, is supported by most devices that comprise a DM client. When the mobile device 202 is assigned an IP address that can be used for sending and receiving notifications, the IPAddr node 420 may be used to provision the IP address for the device. In various embodiments of the invention, the IPAddr node 420 may be part of a connectivity management object, instead of being part of the DevDetail management object.

In various embodiments of the invention, an IP based notification client 204 in the mobile device 202 may be capable of receiving user datagram protocol (UDP) and/or TCP/IP packets that may comprise DM notifications and/or bootstrap messages from the DM server. Thus, the mobile device 202 may not need an SMS client or a WAP stack to receive notifications, bootstrap messages, etc. The IP based notification client 204 may receive the notifications, verify that the source DM server 214 is authorized to send the notification to the mobile device 202, and forwards the notification to the DM client 206.

In various embodiments of the invention, the DM client 206 may conduct the verification of the DM server 214. Various embodiments of the invention may also enable the DM server 214 to have, or receive, information regarding the address of the home agent 210 of the mobile device 202. Accordingly, the DM server 214 may send notifications to the home agent 210, which in turn may tunnel the notification to the mobile device 202.

Although a system and method according to the present invention has been described in connection with the preferred embodiment, it is not intended to be limited to the specific form set forth herein, but on the contrary, it is intended to cover such alternative, modifications, and equivalents, as can be reasonably included within the scope of the present invention as defined by this disclosure and appended diagrams.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for interfacing to an electronic device, the method comprising:

communicating, in a wireless network, an Open Mobile Alliance (OMA) device management (DM) compliant notification message using internet protocol based messages from authorized DM servers to one or more electronic devices, wherein said wireless network is enabled to communicate with said one or more electronic devices using a network protocol that is not internet protocol;

as part of a registration process, a home agent creating a binding table entry in a registry to associate a home address of the one or more electronic devices with a corresponding care-of address;

when the one or more electronic devices is roaming away from a home network, associating the one or more electronic devices with the care-of address;

conducting device management of said one or more electronic devices using internet protocol based messages using the network protocol that is not internet protocol, wherein messages sent to the one or more electronic devices are via WAP Push and the messages are digitally signed to enable proper processing by the one or more electronic devices, the header indicating the type of signature; and wherein the authorized DM servers for the one or more electronic devices are pre-determined, and information identifying the authorized servers is directly pre-provisioned into the one or more electronic devices.

2. The method according to claim 1, comprising communicating an internet protocol address to the electronic device when the electronic device first enters said wireless network without an internet protocol address.

3. The method according to claim 2, wherein said, communication of said internet protocol address is via a network protocol that is not internet protocol.

4. The method according to claim 2, comprising provisioning one or more management objects in the electronic device with said Internet protocol address.

5. The method according to claim 1, wherein said wireless network is a cellular network or said wireless network is an IP based network.

6. A system for interfacing to an electronic device, the system comprising:

one or more processors in a wireless network that enable communication of an Open Mobile Alliance (OMA) device management (DM) compliant notification message using internet protocol based messages from authorized DM servers to one or more electronic devices; wherein said one or more processors enable communication with said one or more electronic devices using a network protocol that is not internet protocol;

wherein management objects provision an IP address into the one or more electronic devices or to retrieve an IP address from the one or more electronic devices, the IP address provided as a node in a management tree with an associated address type;

wherein said internet protocol based messages enable device management of said one or more electronic devices using the network protocol that is not internet protocol;

wherein said internet protocol based messages sent to the one or more electronic devices are via WAP Push and the messages are digitally signed to enable proper processing by the one or more electronic devices, the header indicating the type of signature; and wherein the authorized DM servers for the one or more electronic devices are pre-determined, and information identifying the pre-determined authorized servers is directly pre-provisioned into the one or more electronic devices.

7. The system according to claim 6, wherein said notification message is communicated to said one or more electronic devices, using a network protocol that is not internet protocol.

8. The system according to claim 6, wherein said one or more processors enable communication of an internet protocol address to the electronic device when the electronic device first enters said wireless network without an internet protocol address.

9. The system according to claim 8, wherein said one or more processors enable communication of an internet protocol address via a network protocol that is not internet protocol.

10. The system according to claim 8, wherein said one or more processors enable provisioning of one or more management objects in the electronic device with said internet protocol address.

11. The system according to claim 6, wherein said wireless network is a cellular network or said wireless network is an IP based network.

12. The method according to claim 1, wherein the care-of address identifies for the one or more electronic devices a current topological point of attachment to the Internet.

13. The method according to claim 1, wherein the care-of address is used to route packets to the one or more electronic devices.

14. The method according to claim 1, wherein the care-of address is an address of a foreign agent.

15. The method according to claim 1, wherein the care-of address is an address obtained by the one or more electronic devices for use while present on a particular network.

16. The method according to claim 1, wherein the one or more electronic devices sends packets with a home address as a source IP address, and packets destined for the one or more electronic devices go through the home agent, wherein the home agent then tunnels the packets destined for the one or more electronic devices to the one or more electronic devices using the care-of address.

17. The system according to claim 6, wherein a DM server digitally signs a bootstrap message and notification messages sent to the one or more electronic devices, the signature and signature type delivered as additional headers for the bootstrap message and the notification messages sent to the one or more electronic devices.

18. The system according to claim 6, wherein the wireless network utilizes broadcasts for communicating bootstrap messages and notification messages to the one or more electronic devices, and a broadcast client in the one or more electronic devices monitors one or more assigned channels during a designated time for broadcast messages.

19. The system according to claim 18, wherein specific target devices are targeted by sending at least one set of device information, and wherein subsequent continuous provisioning of parameters in the one or more electronic devices are via broadcast protocols invoking firmware update management object (FUMO) on a particular make, model, and version of the one or more electronic devices, with the make, model, and version of the one or more electronic devices provided as criteria in the broadcast message to enable recipient mobile devices to extract/retrieve and process messages.

20. A system for interfacing to an electronic device, the system comprising:
one or more processors in a wireless network that enable communication of an Open Mobile Alliance (OMA) device management (DM) compliant notification message using internet protocol based messages from authorized DM servers to one or more electronic devices, wherein said one or more processors enable communication with said one or more electronic devices using a network protocol that is not internet protocol;
wherein management objects provision an IP address into the one or more electronic devices or to retrieve an IP address from the one or more electronic devices, the IP address provided as a node in a management tree with an associated address type;
wherein said internet protocol based messages enable device management of said one or more electronic devices using the network protocol that is not internet protocol, wherein messages sent to the one or more electronic devices are via WAP Push and the messages are digitally signed to enable proper processing by the one or more electronic devices, the header indicating the type of signature;
wherein the authorized DM servers for the one or more electronic devices are pre-determined, and information identifying the authorized servers is directly pre-provisioned into the one or more electronic devices; and
wherein the wireless network utilizes broadcasts for communicating bootstrap messages and notification messages to the one or more electronic devices, and a broadcast client in the one or more electronic devices monitors one or more assigned channels during a designated time for broadcast messages.

21. A method for interfacing to an electronic device, the method comprising:
communicating, in a wireless network, an Open Mobile Alliance (OMA) device management (DM) compliant notification message using internet protocol based messages from authorized DM servers to one or more electronic devices, wherein said wireless network is enabled to communicate with said one or more electronic devices using a network protocol that is not internet protocol;
as part of a registration process, a home agent creating a binding table entry in a registry to associate a home address of the one or more electronic devices with a corresponding care-of address;
when the one or more electronic devices is roaming away from a home network, associating the one or more electronic devices with the care-of address;
conducting device management of said one or more electronic devices using interne protocol based messages using the network protocol that is not internet protocol, wherein messages sent to the one or more electronic devices are via WAP Push and the messages are digitally signed to enable proper processing by the one or more electronic devices, the header indicating the type of signature;
wherein the authorized DM servers for the one or more electronic devices are pre-determined, and information identifying the authorized servers is directly pre-provisioned into the one or more electronic devices; and
wherein the wireless network utilizes broadcasts for communicating bootstrap messages and notification messages to the one or more electronic devices, and a broadcast client in the one or more electronic devices monitors one or more assigned channels during a designated time for broadcast messages.

* * * * *

UNITED STATES PATENT AND TRADEMARK OFFICE
CERTIFICATE OF CORRECTION

PATENT NO. : 8,244,845 B2
APPLICATION NO. : 11/947322
DATED : August 14, 2012
INVENTOR(S) : Bindu Rama Rao Page 1 of 1

It is certified that error appears in the above-identified patent and that said Letters Patent is hereby corrected as shown below:

In column 10, line 32, in Claim 3, delete "said," and insert -- said --, therefor.

In column 10, line 48, in Claim 6, delete "devices;" and insert -- devices, --, therefor.

In column 12, line 48, in Claim 21, delete "interne" and insert -- internet --, therefor.

Signed and Sealed this
Nineteenth Day of March, 2013

Teresa Stanek Rea
*Acting Director of the United States Patent and Trademark Office*